US 8,537,201 B2

(12) United States Patent
Choi et al.

(10) Patent No.: US 8,537,201 B2
(45) Date of Patent: Sep. 17, 2013

(54) COMBINING VIDEO DATA STREAMS OF DIFFERING DIMENSIONALITY FOR CONCURRENT DISPLAY

(75) Inventors: Hoon Choi, Mountain View, CA (US);
Daekyeung Kim, Palo Alto, CA (US);
Wooseung Yang, Santa Clara, CA (US);
Young Il Kim, Sunnyvale, CA (US);
Jeoong Sung Park, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 327 days.

(21) Appl. No.: 12/906,939

(22) Filed: Oct. 18, 2010

(65) Prior Publication Data
US 2012/0092450 A1    Apr. 19, 2012

(51) Int. Cl.
*H04N 13/00* (2006.01)
*H04N 13/04* (2006.01)

(52) U.S. Cl.
USPC .............................................. 348/43; 386/241

(58) Field of Classification Search
None
See application file for complete search history.

(56) References Cited

U.S. PATENT DOCUMENTS

| | | | | |
|---|---|---|---|---|
| 6,870,538 B2 * | 3/2005 | MacInnis et al. | ............. | 345/505 |
| 7,496,277 B2 * | 2/2009 | Ackley et al. | ................. | 386/248 |
| 7,573,938 B2 * | 8/2009 | Boyce et al. | ............ | 375/240.02 |
| 7,636,088 B2 * | 12/2009 | Nomura et al. | ................ | 345/419 |
| 8,120,605 B2 * | 2/2012 | Lee et al. | ...................... | 345/419 |
| 2005/0259147 A1 * | 11/2005 | Nam et al. | ....................... | 348/43 |
| 2007/0021738 A1 * | 1/2007 | Hasser et al. | ..................... | 606/1 |
| 2010/0165079 A1 * | 7/2010 | Yamada | .......................... | 348/43 |
| 2010/0303442 A1 * | 12/2010 | Newton et al. | ................ | 386/241 |
| 2011/0096155 A1 * | 4/2011 | Choo et al. | ....................... | 348/58 |
| 2012/0081515 A1 * | 4/2012 | Jang | ............................... | 348/43 |

FOREIGN PATENT DOCUMENTS

| | | |
|---|---|---|
| JP | 2010-0028456 | 2/2010 |
| KR | 10-2007-0041745 | 4/2007 |
| WO | WO2010088420 | 8/2010 |

OTHER PUBLICATIONS

Hitachi Ltd., et al., "High-Definition Multimedia Interface Specification Version 1.4", *HDMI Licensing, LLC*, (Jun. 5, 2009), 425 pp.
International Search Report and Written Opinion from PCT/US2011/055635 mailed Apr. 16, 2012, 10 pgs.

* cited by examiner

*Primary Examiner* — Gims Philippe
*Assistant Examiner* — Reza Aghevli
(74) *Attorney, Agent, or Firm* — Blakely Sokoloff Taylor Zafman LLP

(57) ABSTRACT

Embodiments of the invention are generally directed to combining video data streams of differing dimensionality for concurrent display. An embodiment of an apparatus includes an interface to receive multiple video data streams, a dimensionality of each video stream being either two-dimensional (2D) or three-dimensional (3D). The apparatus further includes a processing module to process a first video data stream as a main video image and one or more video data streams as video sub-images, the processing module including a video combiner to combine the main video data stream and the sub-video data streams to generate a combined video output. The processing module is configured to modify a dimensionality of each of the video sub-images to match a dimensionality of the main video image.

26 Claims, 11 Drawing Sheets

COMBINING VIDEO DATA STREAMS OF DIFFERING DIMENSIONALITY FOR CONCURRENT DISPLAY

TECHNICAL FIELD

Embodiments of the invention generally relate to the field of electronic image display and, more particularly, combining video data streams of differing dimensionality for concurrent display.

BACKGROUND

A display system, such as a television, a computer, or other similar display system, may be utilized to generate a display of multiple video images, the images being generated from multiple video data streams. The display may include concurrent display of multiple data streams.

In particular, a display system may generate a main image and one or more sub-images. For example, a Picture in Picture (PiP) display is a feature of certain video transmitter and receiver elements. In a PiP display, a first channel (main image) is displayed using the majority of the display (such as a full screen display) at the same time as one or more other channels (sub-images) are displayed in inset windows. Thus, the one or more sub-images generally obscure a portion of the main image.

However, video technology is evolving and, rather than being simply two-dimensional (2D) images, may include three-dimensional (3 D) images. In an example, data may include 2D HDMI™ (High Definition Multimedia Interface) video data streams as well as 3D HDMI video data streams. (High Definition Multimedia Interface 1.4 Specification, issued May 28, 2009) Thus, data streams received for generation of images may be 2D video data streams, 3D video data streams, or a combination of 2D and 3D video data streams.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
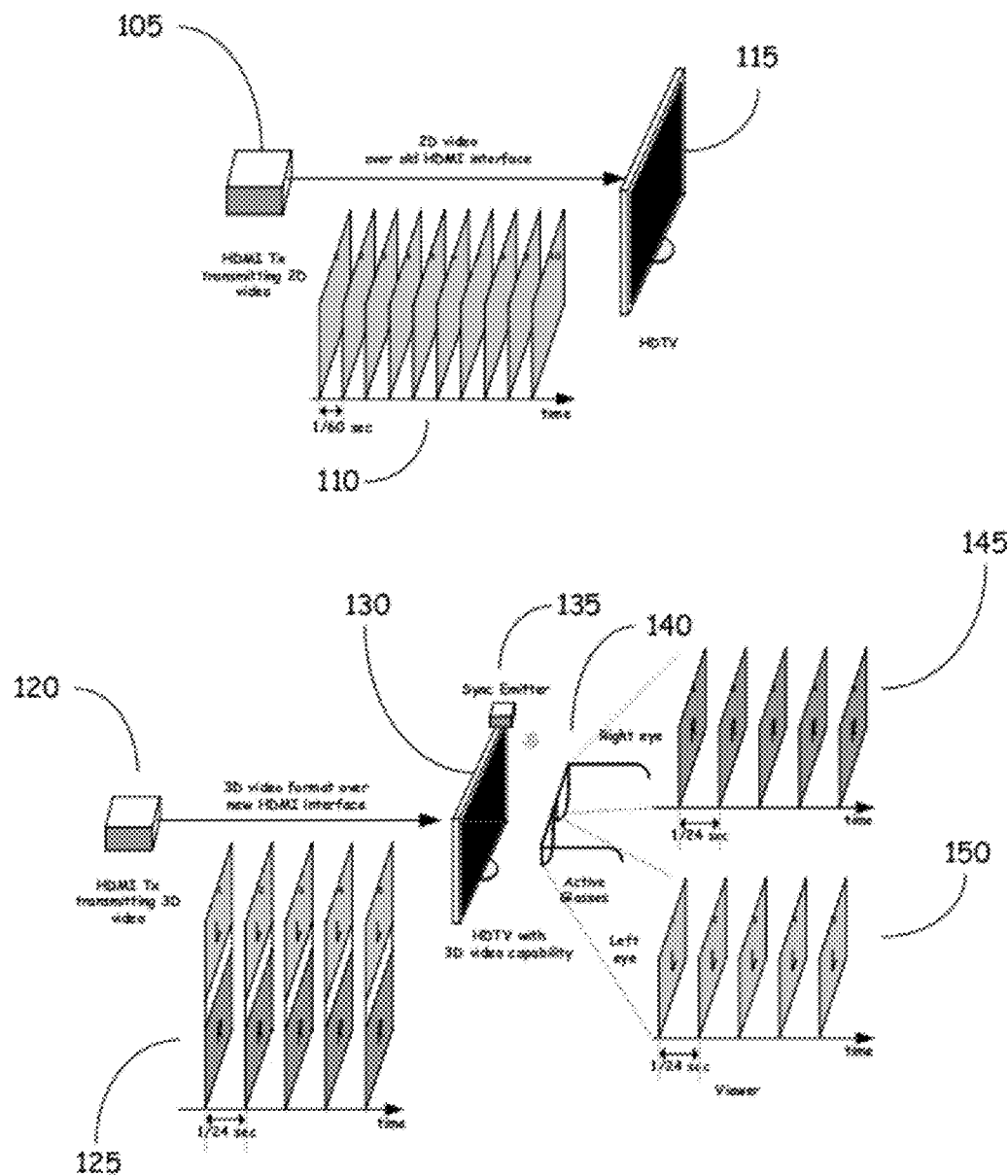
FIG. 1 is an illustration of systems to display 2D and 3D video data streams.

Embodiments of the invention are generally directed to combining video data streams of differing dimensionality for concurrent display.

In a first aspect of the invention, an embodiment of an apparatus includes an interface to receive multiple video data streams, a dimensionality of each video stream being either two-dimensional (2D) or three-dimensional (3D). The apparatus further includes a processing module to process a first video data stream as a main video image and one or more video data streams as video sub-images, the processing module including a video combiner to combine the main video data stream and the sub-video data streams to generate a combined video output. The processing module is configured to modify a dimensionality of each of the video sub-images to match a dimensionality of the main video image.

In a second aspect of the invention, an embodiment of a method includes receiving multiple video data streams, a dimensionality of each of the video data streams being either two-dimensional (2D) or three-dimensional (3D). A first video data stream is selected as a main video channel, and one or more video data streams are selected as a sub-video channels. The dimensionality of each of the sub-video data streams is converted to match the dimensionality of the first data stream. A combined video output is generated, the video output including a main video image generated from the main video channel and a video sub-images generated from the sub-video channels.

In a third aspect of the invention, an embodiment of a video combiner includes a multiplexer to multiplex a main video data stream with one or more sub-video data streams to generate combined pixel data, wherein the data streams may be either three-dimensional (3D) or two-dimensional (2D). The video combiner further includes a synchronization extractor to extract synchronization signals from the main video data stream, a first coordinate processor to identify pixels to be included in the combined pixel data based on the extracted synchronization signals, where the first coordinate processor operates for 2D and 3D main video streams, and a 3D video module including a second coordinate processor to identify pixels to be included in the combined pixel data based on the extracted synchronization signals, where the second coordinate processor operates for 3D main video streams.

DETAILED DESCRIPTION

Embodiments of the invention are generally directed to combining video data streams of differing dimensionality for concurrent display.

In some embodiments, a method, apparatus, or system is provided for concurrent display of multiple video data streams, where the video data streams may include streams of differing dimensionality. The data streams may include both two-dimensional (2D) and three-dimensional (3D) data streams. As used herein, the dimensionality of an image or video stream refers to type or number of dimensions represented by the image or video, and thus whether the video or image is of 2D or 3D dimensionality.

In some embodiments, a method, apparatus, or system may operate to combine or mix images generated from video data streams such that one or more sub-video images are displayed with a main video image in a combined video output, where the method, apparatus, or system operates to match the dimensionality of the images. In some embodiments, one or more sub-video images are converted or synthesized to match the dimensionality of such sub-video images with a main video image.

FIG. 1 is an illustration of systems to display 2D and 3D video data streams. In this illustration, for a two-dimensional case, a transmitting device (data source) 105, such as an HDMI transmitter, may provide a data stream 110 comprising a stream of 2D data frames. The 2D data stream is received by a receiving device (data sink) 115, such as a high definition television (HDTV), to decode and display the 2D image as the data stream is received. 3D video format is a newer feature of HDMI, in which the viewer is to see a slightly different image in each eye to create an illusion of depth in an image. For a three-dimensional case, a transmitting device for 3D video 120, such as a 3D-compatible HDMI transmitter, may provide a data stream 125 comprising a stream of 3D data frames containing left and right channel images. As shown in FIG. 1, 3D-capable HDMI transmitters pack both left and right images within a single frame for transmitting the frames over an HDMI data stream. The 3D data stream is received by a receiving device 130, such as an HDTV with 3D video capability, to display the left and right channels. When the 3D-capable HDTV 130 receives a 3D frame, it decodes and splits a data frame into left and right images. There are several methods for displaying stereoscopic image, with active shutter glasses 140 being a popular method for HDTV viewing. As illustrated, the HDTV implements stereoscopic display by alternating between left and right image on a display panel. In this illustration, active glasses 140 block or pass light in sync with the left image 150 or right image 145 being displayed by the HDTV 130, with the HDTV 130 including a sync emitter 135 to broadcast a synchronization signal for operation of the active glasses 140.

Figure 2:
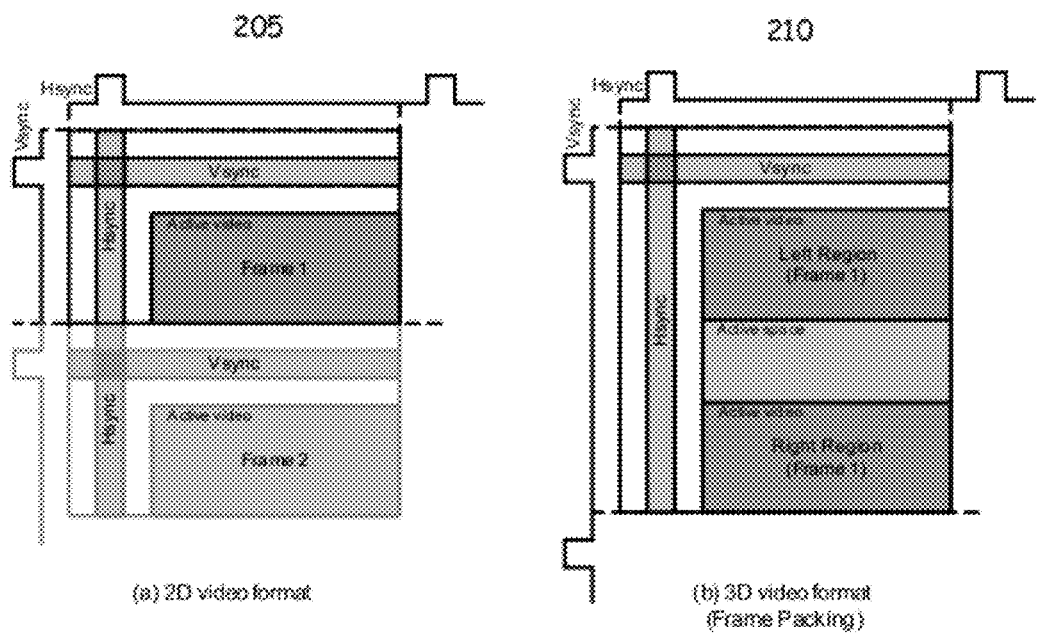
FIG. 2 is an illustration of 2D and 3D video data frames.

FIG. 2 is an illustration of 2D and 3D video data frames. FIG. 2 illustrates a 2D video format 205 and a 3D video format 210. In the 2D format 205, a single active video region is provided, such as Frame 1 followed by second frame, Frame 2. In the 3D video format 210, two active video regions, shown as a left region and a right region, together with and active space between the two active video regions, compose a 3D active video frame. There are several possible formats for the 3D video structure, with the possibilities including frame packing, field alternative, line alternative, side-by-side, L+ depth and others. Most of such formats have a similarity to the illustrated frame structure in that two 2D frames (left and right) comprise a single 3D frame. However, embodiments are not limited to this type of 3D structure.

Figure 3:
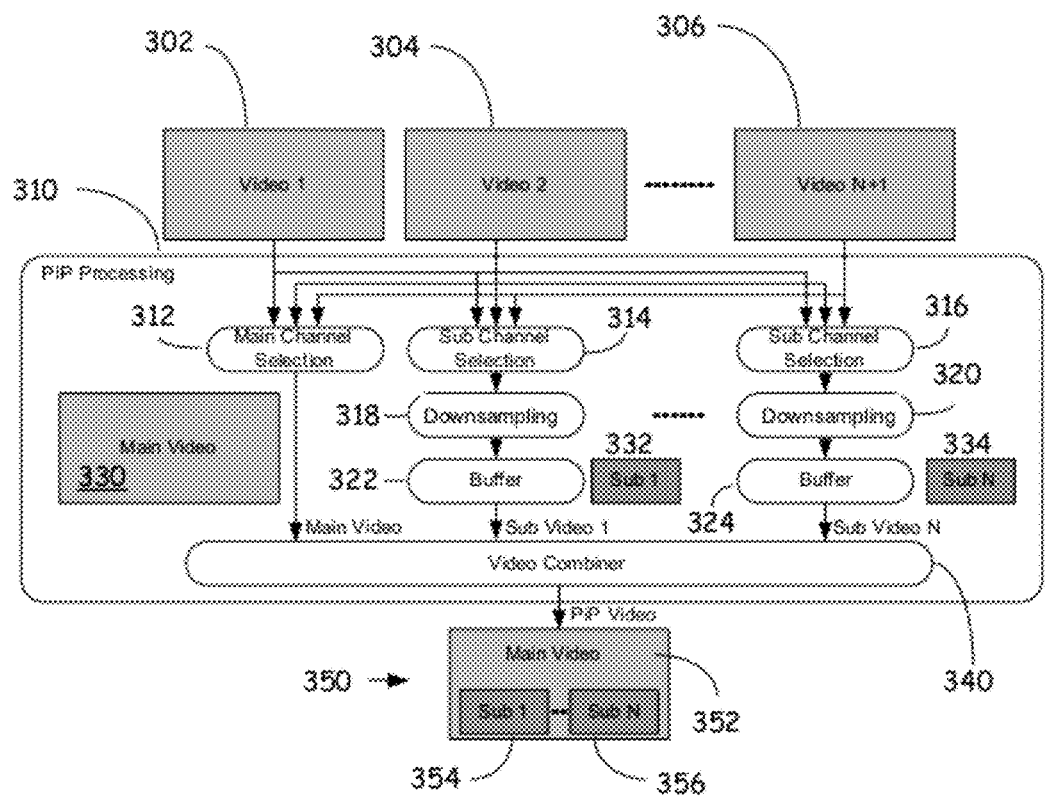
FIG. 3 is an illustration of an embodiment of an apparatus and system for processing and display of main video and sub-video data streams.

FIG. 3 is an illustration of an embodiment of an apparatus and system for processing and display of main video and sub-video data streams. In this illustration, a general flow diagram of an embodiment for generating PiP video from multiple video streams is provided. In some embodiments, one of multiple incoming video channels is selected by the viewer to be used for main video. In this illustration, the chosen video channel is Video 1, element 302, to produce the main video 330. One or more other incoming video channels may be selected for sub-video channels, which in this illustration are Video 2, element 304, via sub-channel selection 314 through Video N+1, element 306, via sub-channel selection 316. In some embodiments, a sub-video channel may include an on-screen display (OSD), where an OSD is a feature to overlay information, such as, for example, a setup menu or a closed caption, over a video image. In some embodiments, a video channel selected as a sub-video channel may be downsized, including but not limited to downsampling, downscaling, or cropping of the video channel, to fit a screen window for display. In some embodiments, a downsizing element, such as downsampling process or module 318-320, reduces the size of the sub-video coming from the sub-channels, and generates sub-images that are denoted in FIG. 3 as Sub 1, element 332, and Sub N, element 334. In some embodiments, in order to synchronize sub-images to the main video stream, the sub-images are received from the downsampling modules and temporarily stored in one or more buffers 322-324 prior to combining images. In some embodiments, the buffers are utilized to provide pixel data for the sub-video to be overlaid in a portion or portions of the main video 330. In some embodiments, a video combiner process or module 340 operates to merge the main video image 330 and sub-video images 332-334 for display within a single screen, shown as a combined video output 350 containing main video 352 and sub-videos 354-356. In contrast to conventional PiP video that assumes that all incoming video streams are 2D video that may have different resolution and sampling rates, some embodiments provide for enhancement of video combination function to support 2D and 3D video together for PiP display.

In some embodiments, an apparatus, system, or method provides for combining both homogeneous and heterogeneous video for PiP display. In some embodiments, for heterogeneous PiP display, at least one of the incoming video data streams is 2D video data while at least one of the incoming video data streams is 3D video data. In some embodiments, an outgoing video may be either a 2D or 3D video image depending on the dimensionality of the main incoming video.

Table 1 illustrates combinations of incoming 2D and 3D video data streams and the resulting outgoing PiP video image. In some embodiments, the dimensionality of the outgoing PiP video is associated with the dimensionality of the data stream that is selected to be the main video data image.

TABLE 1

| Case | Incoming Main Video Data Stream | Incoming Sub-Video Data Stream | Outgoing PiP Video |
| --- | --- | --- | --- |
| 2D in 2D | 2D | 2D | 2D |
| 3D in 3D | 3D | 3D | 3D |
| 3D in 2D | 2D | 3D | 2D |
| 2D in 3D | 3D | 2D | 3D |

Figure 4:
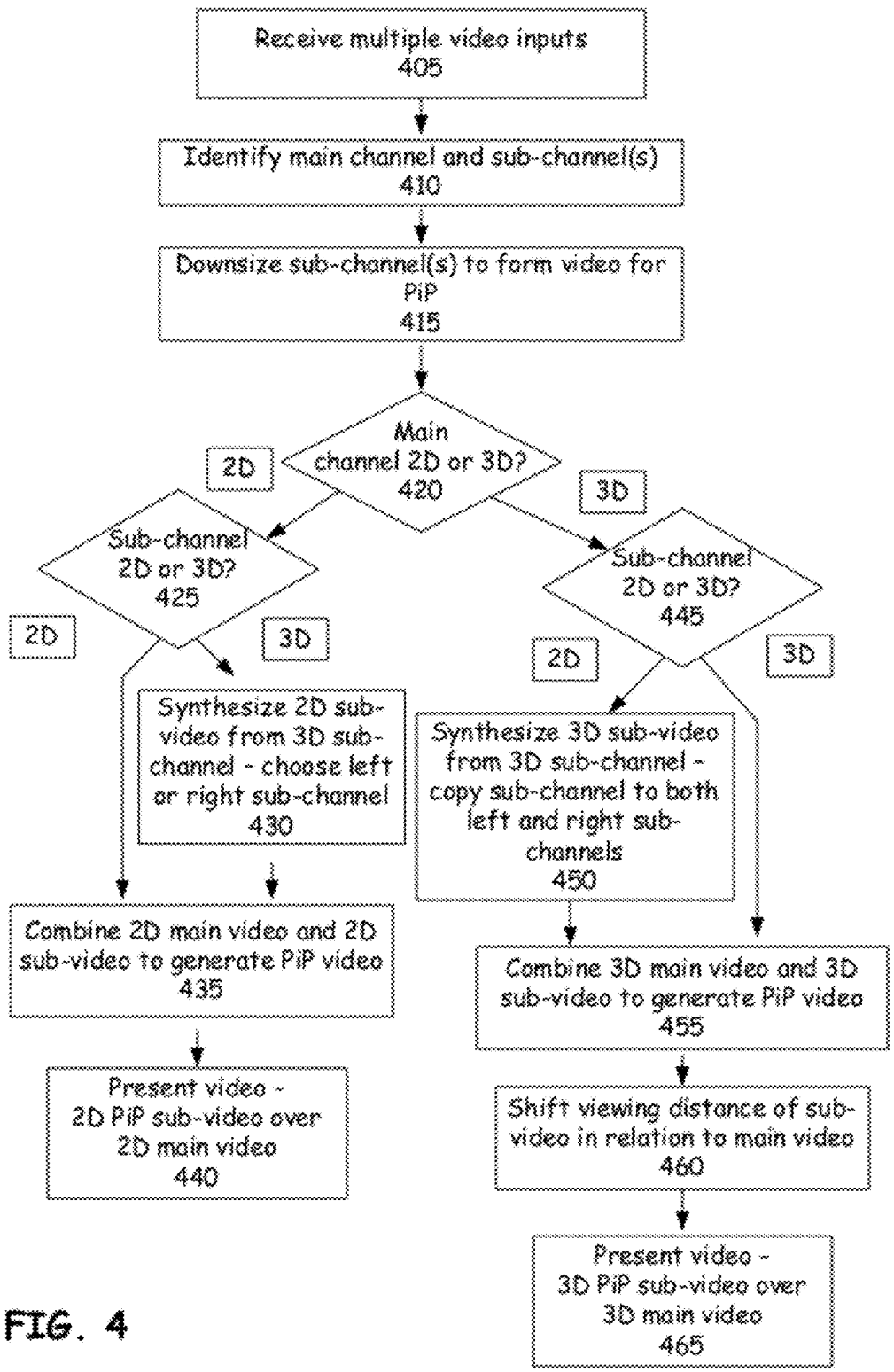
FIG. 4 is a flowchart to illustrate an embodiment of a process for handling video data streams.

FIG. 4 is a flowchart to illustrate an embodiment of a process for handling video data streams. In this illustration, multiple video inputs are received 405, wherein the video inputs may be any combination of 2D and 3D video data stream. Of the video inputs, a main channel and one or more sub-channels are identified 410. In some embodiments, the sub-channels are downsized to form sub-videos for a PiP display 415.

In some embodiments, if the main video is 2D 420 and a sub-channel is 2D 425, this then results in a combination of the 2D main video and 2D sub-video 435, as occurs in a conventional PiP operation. However, if the main video is 2D 420 and a sub-channel is 3D 425, a 2D sub-video is synthesized from the 3D sub-channel 430. For example, the 2D sub-video may be synthesized by choosing either the left channel or the right channel of the 3D video data stream for the video to be downsampled and combined to utilize for the PiP video output. The 2D main video and 2D synthesized sub-video are combined to form the combined PiP video output 435. Subsequent to combination, the video may be presented, with the combined video being the 2D sub-video as a picture in picture over the 2D main video 440.

In some embodiments, if the main video is 3D 420 and a sub-channel is 2D 445, then a 3D sub-video is synthesized from the 2D sub-channel 450. For example, the 3D sub-video may be synthesized by copying the sub-channel to both left and right sub-channels for the synthesized 3D sub-channel. The synthesized 3D sub-channels are downsized and combined with the 3D main channel to generate the PiP video 455. The 3D main video and 3D synthesized sub-video are combined to form the combined PiP video output 455. If the main video is 3D 420 and a sub-channel is 3D 445, this then results in a combination of the 3D main video and 3D sub-video 455. With the use of the 3D main video, the combination of the videos may include shifting the relative viewing distance of the sub-video compared with the main video 460. Subsequent to combination, the video may be presented, with the combined video output being the 3D sub-video as a picture in picture over the 3D main video 465.

Figure 5:
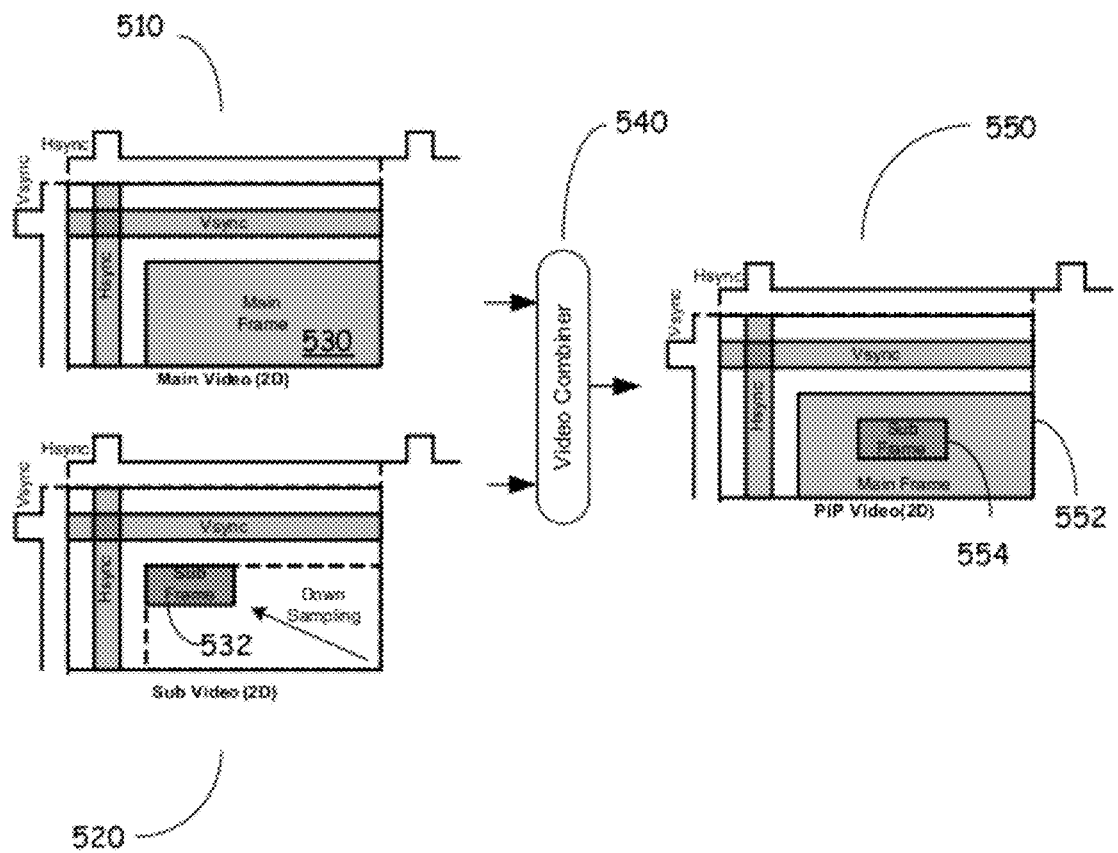
FIG. 5 illustrates an embodiment for combining a 2D main video data stream and a 2D sub-video data stream.

FIG. 5 illustrates an embodiment for combining a 2D main video data stream and a 2D sub-video data stream. In some embodiments, a 2D video channel may be selected as a main channel 510, each video frame including a single main video frame 530. A 2D video channel may further be chosen as a sub-channel 520, each video frame including a single video frame that is downsized to form the sub-video frame 532. In some embodiments, a video combiner 540 receives the main video frames and the sub-video frames, where the video combiner 540 operates to merge the main video and sub-video streams. In some embodiments, the combining process replaces pixels of the main video with pixels of the sub-video within a sub-frame region that is defined by the viewer or the video system. The result is a combined video 550 including a main video frame 552 and one or more sub-video frames 554, where the one or more sub-video frames obscure a portion of the main video frame 552.

Figure 6:
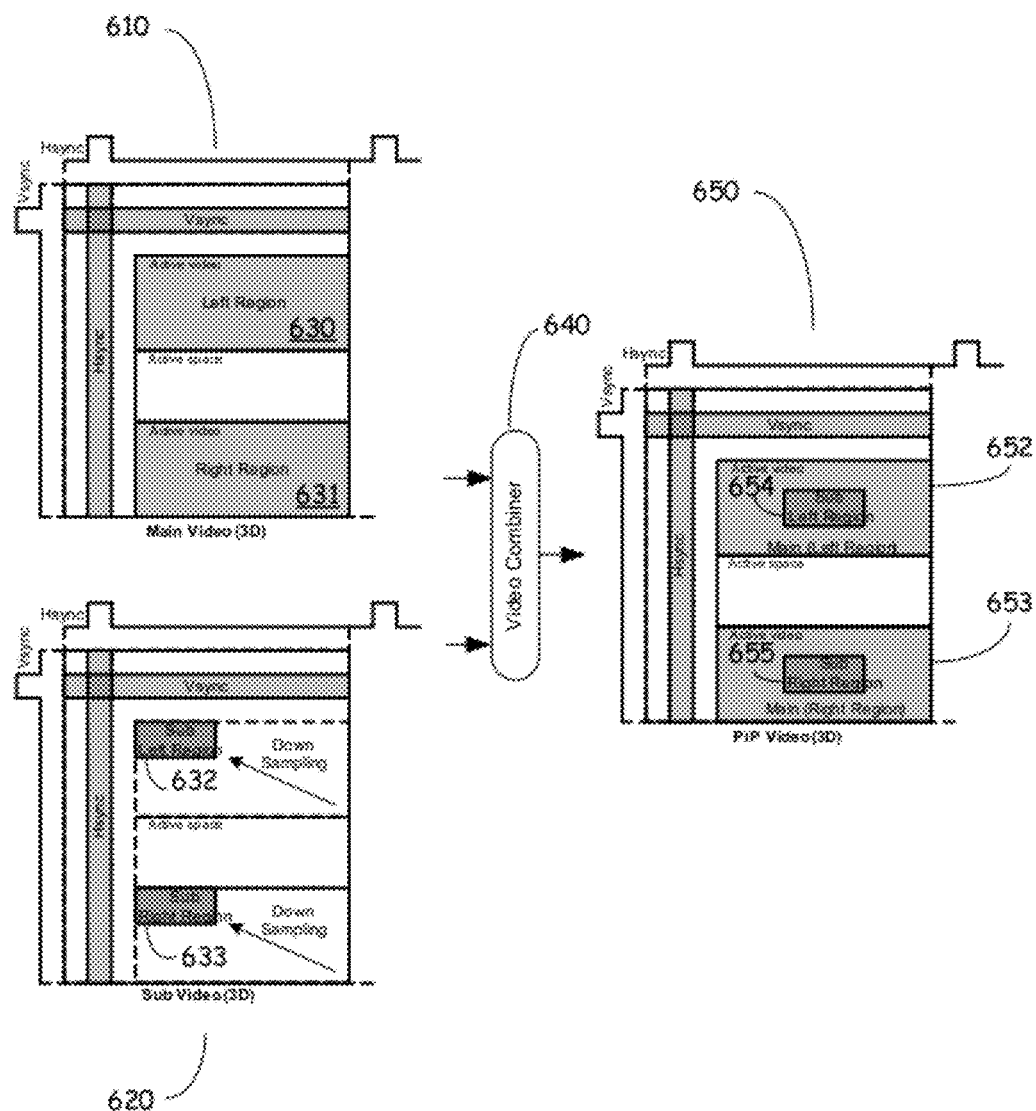
FIG. 6 illustrates an embodiment for combining a 3D main video data stream and a 3D sub-video data stream.

FIG. 6 illustrates an embodiment for combining a 3D main video data stream and a 3D sub-video data stream. In some embodiments, a 3D video channel may be selected as a main channel 610, each video frame including a left video frame region 630 and a right video frame region 631. A 3D video channel may further be chosen as a sub-channel 620, each video frame including a left video frame region that is downsized to form the left sub-frame region 632 and a right video frame region that is downsized to form the right sub-frame region 633. Thus, both the main video and sub-video are 3D video that contain left and right regions within a single 3D frame. In some embodiments, a video combiner 640 receives the main video frames and the sub-video frames and operates to merge the main video and sub-video streams, the video combiner 640 inserting the left region of sub-video into the left region of main video and inserts the right region of the sub-video into the right region of main video. The combined video 650 includes a main left video region 652 with left sub-video region 654 and a main right video region 653 with right sub-video region 655, where sub-video regions obscure a portion of the main video regions.

Figure 7:
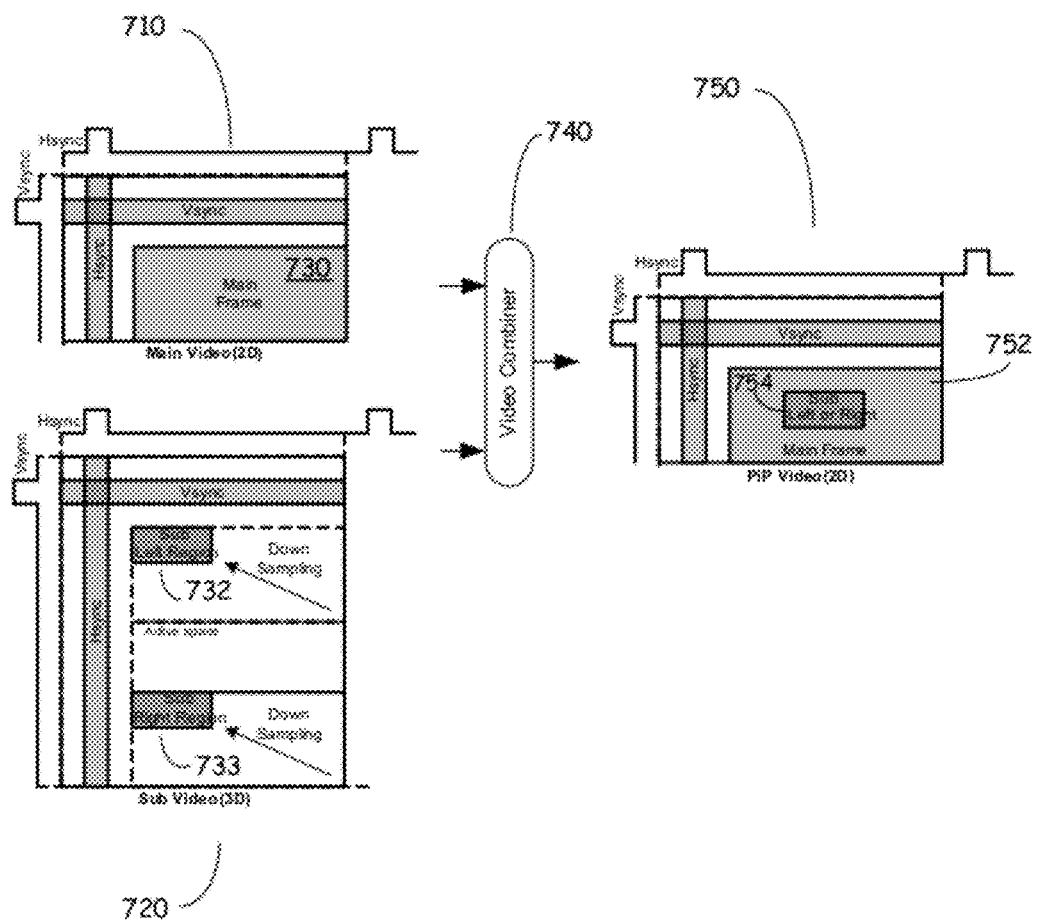
FIG. 7 illustrates an embodiment for combining a 2D main video data stream and a 3D sub-video data stream.

FIG. 7 illustrates an embodiment for combining a 2D main video data stream and a 3D sub-video data stream. In this case, a generated PiP video is 2D and does not present 3D effects on viewer's screen. In some embodiments, because the main video is 2D, the dimensionality of the generated PiP video will be 2D. However, the incoming sub-video is 3D. In some embodiments, in order to match the sub-video dimensionality to the main video dimensionality, the 3D sub-video is synthesized to generate 2D video. There are multiple methods for converting or synthesizing 3D video to form 2D video. In some embodiments, a method for conversion includes discarding one side of a video region and using only the other side. For example, the video combiner may discard the left region of each sub-video frame and insert the right region into the main video. Although viewers can only see the right image of each sub-video frame in the generated inset screen, there generally is no major loss of information because only a slight difference between the left and right images is required for creating the illusion of depth in the image. However, embodiments are not limited to any particular process for converting a 3D channel to generate a 2D video image.

As illustrated in FIG. 7, a 2D video channel may be selected as a main channel 710, each video frame including a single video frame region 730. A 3D video channel may be chosen as a sub-channel 720, each video frame including a left video frame region that is downsized to form the left sub-frame region 732 and a right video frame region that is downsized to form the right sub-frame region 733. Thus, the main video channel and the sub-video channel have differing dimensionalities. In some embodiments, the dimensionality of the sub-video is converted to generate a 2D sub-video image. In some embodiments, a video combiner 740 receives the main video frames and the sub-video frames and operates to merge the main video and sub-video streams, the video combiner eliminating either the left or the right region on the sub-video and inserting the remaining region of sub-video into the main video. The combined video 750 includes a main video region 752 with an inset window containing the right or left sub-video region 754.

Figure 8:
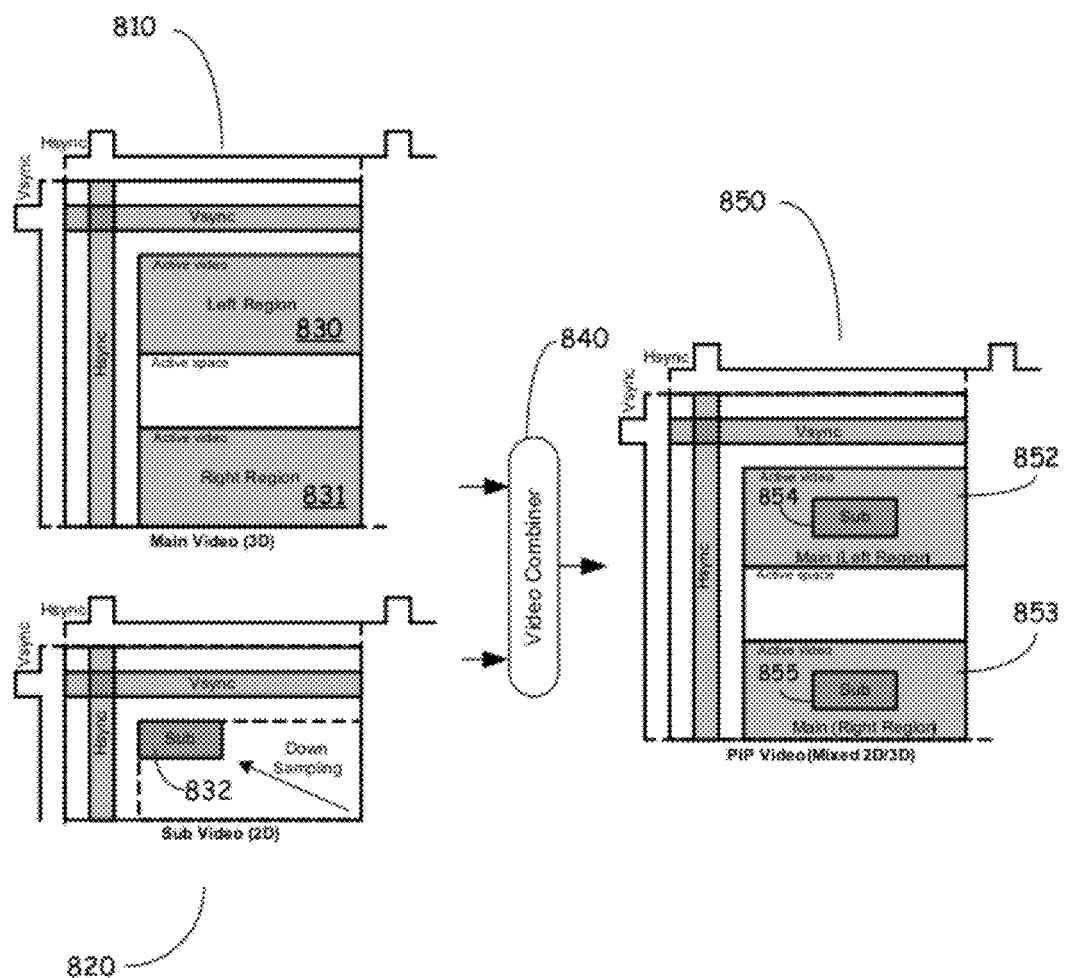
FIG. 8 illustrates an embodiment for combining a 3D main video data stream and a 2D sub-video data stream.

FIG. 8 illustrates an embodiment for combining a 3D main video data stream and a 2D sub-video data stream. In this illustration, an incoming sub-video is 2D and thus there is only a single image per 2D frame, as opposed to one left image and one right image per 3D frame. In some embodiments, in order to match the dimensionality of the sub-channel 820 (which is downsized to generate the sub-video image 832) to the 3D format of main video channel 810 (for which each frame includes a left region 830 and right region 831) the video combiner 840 synthesizes a 3D video image from the 2D sub-video data. In some embodiments, the video combiner 840 operates to insert the same sub-image twice into the main video frame. In some embodiments, a copy of the same image of the sub-video is inserted into both the left region and the right region of the main video image to generate the PiP video 850, illustrated as first sub-video 854 in left region 852 and second sub-video 855 in right region 853.

However, a viewer viewing the generated PiP video in FIG. 8 will see the 3D effects of the main video outside the inset window while not seeing any 3D effect inside the inset window. Thus, if the inset window is not modified, the image inside the inset window may appear to be flat and two-dimensional at the same depth as the frame of the display screen. Thus, in some embodiments, a synthesized inset video sub-image is further modified to change the apparent depth of the video.

Figure 9A:
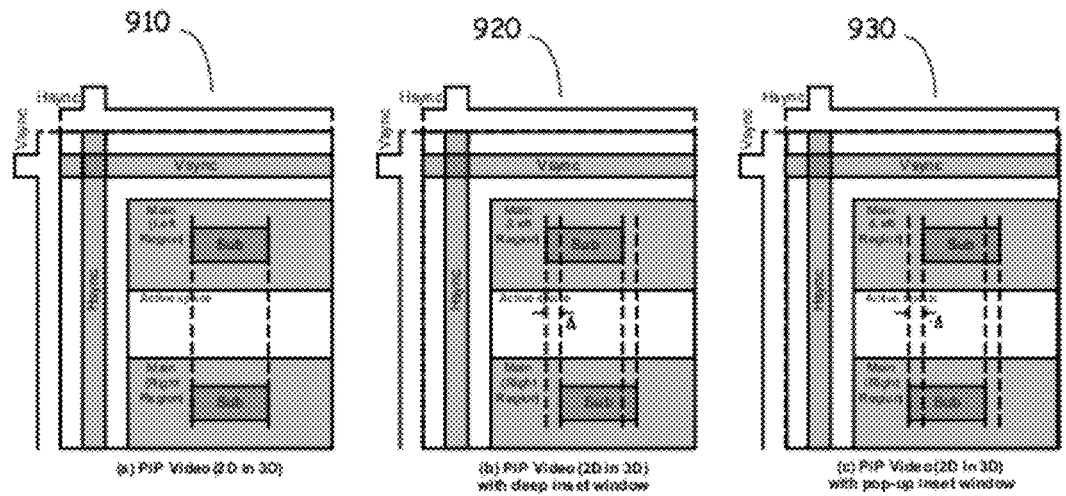
FIG. 9A illustrates an embodiment for shifting 2D sub-video data streams within a 3D main video data stream.

FIG. 9A illustrates an embodiment for shifting 2D sub-video data streams within a 3D main video data stream. In this illustration, an optional and supplemental method for enhancing "2D in 3D" PiP video is provided. Although a 3D effect inside an inset window in "2D in 3D" PiP video is not generated because the source of the sub-video data stream does not include 3D information, in some embodiments an apparatus or system may adjust the apparent "depth" of the entire inset window. The term "depth" here indicates a virtual distance that a viewer perceives when the viewer views the screen with 3D glasses.

When the video combiner inserts a sub-image to the same location for both left and right regions of a main video as depicted in video 910 in FIG. 9A, the inset window appears to the viewer to be located in the same distance as the frame of the screen. In some embodiments, the apparent depth for the viewer may be adjusted such that the inset window appears to the viewer to be located deeper/further away than the frame of the screen. As shown in video 920, the video combiner may locate the sub-image more left in the left region and places the same sub-image more right in the right region. The offset between the two sub-images is indicated by the symbol "Δ". As the value of Δ becomes larger, viewer perceives that the inset window is located deeper than (or farther away from) the frame of the screen.

In some embodiments, an apparatus or system may also adjust the depth of an inset window such that the viewer perceives that the inset window pops up from the screen. As illustrated in video 930, a video combiner may place the sub-image more right in the left region and place the same sub-image more left in the right region. The offset between two sub-images is indicated by the symbol "−Δ". As the value of Δ becomes more negative (below zero), the viewer perceives that the inset window pops up more (or thus is located nearer to the viewer) than the frame of the screen.

Figure 9B:
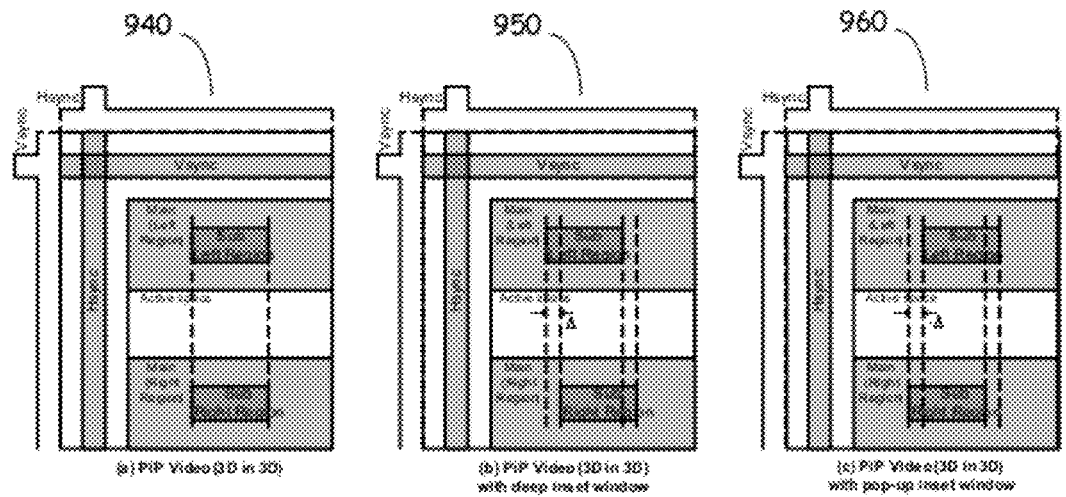
FIG. 9B illustrates an embodiment for shifting 3D sub-video data streams within a 3D main video data stream.

FIG. 9B illustrates an embodiment for shifting 3D sub-video data streams within a 3D main video data stream. In this illustration, an inset window in video 940 already has 3D effects, the inset window being based on a 3D video data stream. In some embodiments, an apparatus or system further provides an offset to generate a perceived depth to inset windows. In this illustration, when a positive value of Δ is provided, as shown in the shift of the inset windows in video 950, the viewer perceives that the entire 3D image within the inset window is located deeper (is farther away) than the main video. In some embodiments, similarly, when a negative value of Δ is provided, as illustrated in video 960, the viewer perceives that the entire 3D image with the inset window pops up from (is closer than) the main video.

In some embodiments, the depth adjustment feature may be utilized to allow viewers to focus on the major object. The major object may be either the main video or the one or more inset windows. For example, in normal picture-in-picture mode, viewers typically want to focus on the main video. If the inset window pops up or is located in the same depth as the frame of the screen, the inset windows may distract viewers' focus and concentration. In this example, an apparatus or system may locate the inset windows deeper by setting the value of Δ to a positive value so that viewers can focus more on the main video. In another example, in a channel switching mode viewers want to navigate using the inset windows to select the next channel to watch. In this case, viewers may prefer to focus on the inset windows. As shown in video 930 or 960, an apparatus may adjust the depth of inset windows to pop up by using a negative Δ value, and thus operate to attract a viewer's attention. Thus, in some embodiments, if the major object is the main video, the video combiner may utilize a positive Δ value to increase the perceived depth of the inset windows, and if the major object is an inset video, the video combiner may utilize a negative Δ value to decrease the perceived depth of the inset windows. In some embodiments, the depth adjustment feature may be further utilized to adjust an apparent depth of an on-screen display (OSD). An OSD may be treated as a sub-video channel for purposes of adjusting the depth of the OSD as illustrated in FIGS. 9A and 9B. Utilizing the depth adjustment feature, a system can cause the OSD to appear to pop up from or locate deeper than the main video.

Figure 10:
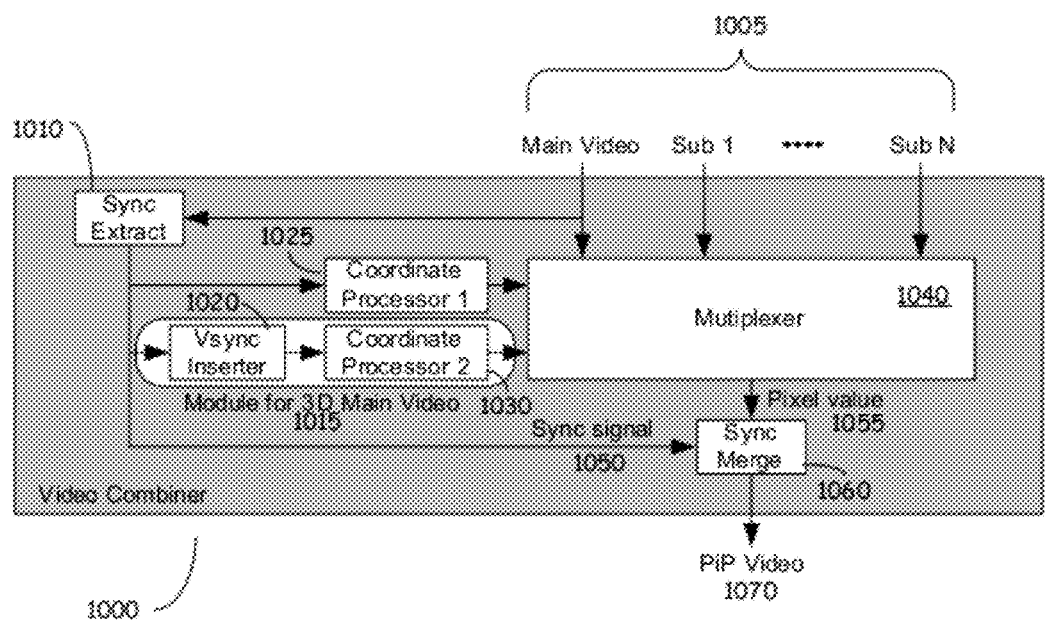
FIG. 10 illustrates an embodiment of a video combiner for combining data streams of varying dimensionality.

FIG. 10 illustrates an embodiment of a video combiner for combining data streams of varying dimensionality. The video combiner 1000 may be, for example, video combiner 340 illustrated in FIG. 3. In FIG. 10 a video combiner 1000 operates to take main video channel and one or more sub-video channels as inputs and generates an outgoing PiP video. In some embodiments, the video combiner operates to forward the data frames of the main video stream with minimal modification, and then replaces pixels of main video within an inset window with pixels of a sub-video to form the resulting PiP image.

In some embodiments, the video combiner 1000 includes multiple modules as shown in FIG. 10. In some embodiments, the video combiner receives multiple video channels 1005, including a channel chosen as the main video and one or more other channels that may be chosen as sub-videos, such as Sub 1 through Sub N in FIG. 10. In some embodiments, the video channels 1005 are received by a multiplexer 1040 that operates to replace pixel values of the main channel with pixels of the sub-channels to generate a PiP display. In some embodiments, the multiplexer may utilize alpha-blending to mix the main channel pixel data and sub-channel data pixel in a predefined ratio, where alpha-blending describes a process for combining a first (alpha) image with one or more image layers to provide a translucent image. In some embodiments, a sync extract module operates to separate synchronization signals such as Vsync (Vertical synchronization), Hsync (Horizontal synchronization) and DE (Data enable) signals from the main video interface. In some embodiments, the synchronization signals 1050 from the main video are forwarded to a synchronization merge process or module 1060 for the generation of a PiP video output. In some embodiments, a first coordinate processor 1025 traces the coordinate of the current transmitted pixel and determines if the current pixel is located inside the inset window or not. The result of the determination is used to control the multiplexer in selecting the source for the generation of the PiP video. In some embodiments, a module for 3D main video 1015 includes a vertical synchronization inserter (Vsync inserter) 1020 and a second coordinate processor 1030. In some embodiments, the second coordinate processor 1030 is used in addition to the first coordinate processor 1025 when main video is 3D video. In the case of the 3D main video, first coordinate processor 1025 controls the left region of the 3D format while second coordinate processor 1030 controls the right region of the 3D format. In some embodiments, the second coordinate processor 1030 may be shared with the first coordinate processor 1025. In some embodiments, the Vsync inserter 1020 operates to insert an additional Vsync signal into the active space region in the 3D format of the main video, which allows second coordinate processor 1030 to calculate coordinates without requiring knowledge of the 3D format. In some embodiments, the resulting pixel values 1055 from the multiplexer 1040 together with the sync signal 1050 from the sync extract module 1010 are received by the sync merge module 1060 to generate the PiP video 1070 for display.

As illustrated in FIG. 9A and FIG. 9B, in circumstances in which the chosen main video channel is a 3D channel, the apparent depth of the inset window may be adjusted by a variance between left and right sub-images. In this case, the horizontal coordination of first coordinate processor 1025 differs from that of second coordinate processor 1030. This difference makes the horizontal distance Δ between the left inset window and right inset window, as shown in videos 920 and 930 of FIG. 9A and videos 950 and 960 of FIG. 9B.

Figure 11:
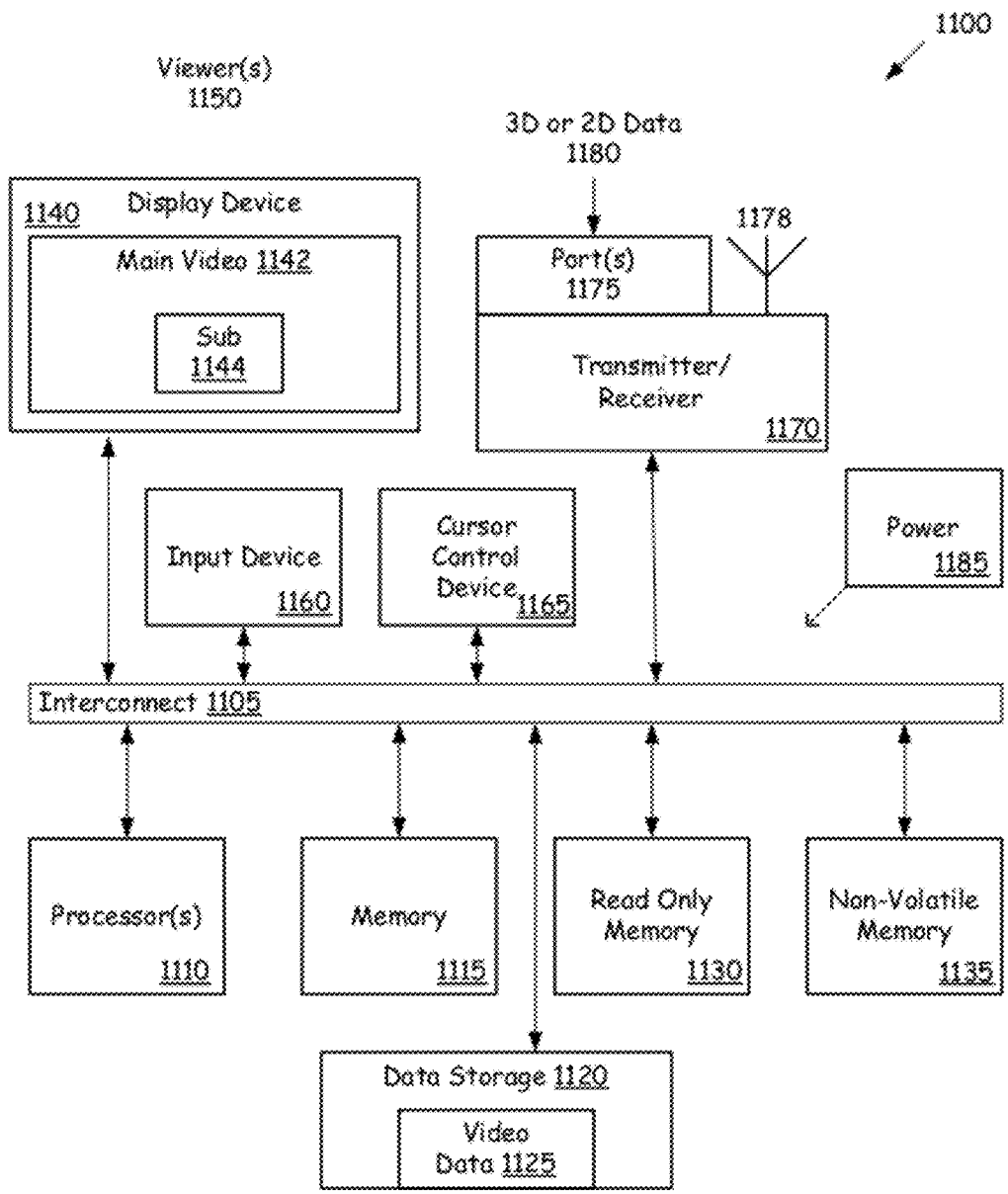
FIG. 11 illustrates an embodiment of an apparatus or system for processing data streams of varying dimensionality.

FIG. 11 illustrates an embodiment of an apparatus or system for processing data streams of varying dimensionality. In this illustration, certain standard and well-known components that are not germane to the present description are not shown. Under some embodiments, a device or system 1100 is an apparatus or system to generate and display concurrent video images, the video images being main video images and one or more sub-video images.

Under some embodiments, the apparatus or system 1100 comprises an interconnect or crossbar 1105 or other communication means for transmission of data. The data may include audio-visual data and related control data. The apparatus or system 1100 may include a processing means such as one or more processors 1110 coupled with the interconnect 1105 for processing information. The processors 1110 may comprise one or more physical processors and one or more logical processors. Further, each of the processors 1110 may include multiple processor cores. The interconnect 1105 is illustrated as a single interconnect for simplicity, but may represent multiple different interconnects or buses and the component connections to such interconnects may vary. The interconnect 1105 shown in FIG. 11 is an abstraction that represents any one or more separate physical buses, point-to-point connections, or both connected by appropriate bridges, adapters, or controllers. The interconnect 1105 may include, for example, a system bus, a peripheral component interconnect (PCI) or PCI express (PCIe) bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The apparatus or system 1100 further may include a serial bus, such as a universal serial bus (USB), to which may be attached one or more USB compatible connections.

In some embodiments, the apparatus or system 1100 further comprises a random access memory (RAM) or other dynamic storage device as a memory 1115 for storing information and instructions to be executed by the processors 1110. Memory 1115 also may be used for storing data for data streams or sub-streams. RAM memory includes, for example, dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may contain certain registers, buffers, or other special purpose memory. The apparatus or system 1100 also may comprise a read only memory (ROM) 1130 or other static storage device for storing static information and instructions for the processors 1110. The apparatus or system 1100 may include one or more non-volatile memory elements 1135 for the storage of certain elements.

In some embodiments, a data storage 1120 may be coupled to the interconnect 1105 of the apparatus or system 1100 for storing information and instructions. The data storage 1120 may include a magnetic disk, an optical disc and its corresponding drive, or other memory device. Such elements may be combined together or may be separate components, and utilize parts of other elements of the apparatus or system 1100. In some embodiments, the data storage may include storage of video data 1125 for presentation on a display.

The apparatus or system 1100 may also be coupled via the interconnect 1105 to a display device or element 1140. In some embodiments, the display 1140 may include a liquid crystal display (LCD), a plasma display, or any other display technology, for displaying information or content to an end user. In some embodiments, the display 1140 may be utilized to concurrently display multiple images, where the multiple images include a main video and one or more sub-video image. In some embodiments, the multiple images may be generated from multiple video data streams received by the apparatus or system 1100, where a first video stream is selected as the main video 1142 and one or more other video data streams are selected as sub-video images 1144, where the multiple video data streams may differ in dimensionality. In some embodiments, the processors 1110 may operate to process the received data streams to generate a PiP display for viewing by one or more viewers 1150. In some embodiments, the data streams selected as sub-video images may be converted or synthesized to match the dimensionality of the main video 1142.

In some embodiments, an input device 1160 may be coupled to or communicate with the apparatus or system 1100 for communicating information and/or command selections to the processors 1110. In various implementations, the input device 1160 may be a remote control, keyboard, a keypad, a touch screen, voice activated system, or other input device, or combinations of such devices. In some embodiments, the apparatus or system 1100 may further include a cursor control device 1165, such as a mouse, a trackball, touch pad, or other device for communicating direction information and command selections to the one or more processors 1110 and for controlling cursor movement on the display 1140.

One or more transmitters or receivers 1170 may also be coupled to the interconnect 1105. In some embodiments, the apparatus or system 1100 may include one or more ports 1175 for the reception or transmission of data. Data that may be received or transmitted may include 3D or 2D video data streams 1180. The apparatus or system 1100 may further include one or more antennas 1178 for the reception of data via radio signals. The apparatus or system 1100 may also comprise a power device or system 1185, which may comprise a power supply, a battery, a solar cell, a fuel cell, or other system or device for providing or generating power. The power provided by the power device or system 1185 may be distributed as required to elements of the apparatus or system 1100.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. An apparatus comprising:
   an interface to receive a plurality of video data streams, a dimensionality of each video stream being either two-dimensional (2D) or three-dimensional (3D); and
   a processing module to process a first video data stream of the plurality of video streams as a main video image and a second video data stream of the plurality of data streams as a video sub-image, the processing module including a video combiner to combine the main video data stream and the sub-video data stream to generate a combined video output;
   wherein a dimensionality of the first video data stream is 3D and a dimensionality of the second video data stream is 2D, and wherein the processing module is configured to modify the 2D dimensionality of the video sub-image to 3D to match the 3D dimensionality of the main video image;
   wherein conversion of the second video stream from 2D to 3D includes copying each frame of data of the second video data stream into a left channel region and a right channel region and adjusting an apparent depth for a viewer between the video sub-image and a display frame by modifying a difference between a position of the frame of the second video data stream in the left channel region and a position of the frame of the second video data stream in the right region.

2. The apparatus of claim 1, wherein the processing module is further configured to downsize the second video stream to fit the second video stream into a region for the video sub-stream.

3. The apparatus of claim 2, wherein downsizing the second video stream comprises downsampling, downscaling, or cropping the video stream.

4. The apparatus of claim 1, wherein the second video stream includes an on-screen display (OSD), and wherein conversion of the second video stream includes adjusting an apparent depth for the viewer between the OSD and the video frame.

5. The apparatus of claim 1, further comprising a display screen to display one or more images, wherein the one or more images may include the main video image and the video sub-image, wherein the video sub-image is smaller than the main video image and obscures a portion of the main video image.

6. The apparatus of claim 1, wherein the video combiner includes a multiplexer to multiplex the sub-video data stream with the main video data stream to generate output pixel data.

7. The apparatus of claim 6, wherein the video combiner includes a module to extract synchronization signals from the first video data stream.

8. The apparatus of claim 7, wherein the video combiner includes a module to receive the output pixel data and the extracted synchronization signals to generate the combined video output.

9. The apparatus of claim 6, wherein the video combiner includes one or more coordinate processors to determine which pixels of the sub-video data stream and the main video data stream are to be included in the output pixel data.

10. A method comprising:
    receiving a plurality of video data streams, a dimensionality of each of the plurality of video data streams being either two-dimensional (2D) or three-dimensional (3D);
    selecting a first video data stream of the plurality of video data streams as a main video channel, a dimensionality of the first video data stream being 3D;
    selecting a second video data stream of the plurality of data streams as a sub-video channel, a dimensionality of the second video data stream being 2D;
    converting the dimensionality of the second video data stream from 3D to 2D to match the dimensionality of the first video data stream; and
    generating a combined video output, the video output including a main video image generated from the main video channel and a video sub-image generated from the sub-video channel;
    wherein conversion of the dimensionality of the second video data stream from 2D to 3D includes copying each frame of data of the second video data stream into a left channel region and a right channel region and adjusting an apparent depth for a viewer between the video sub-image and a display frame by modifying a difference between a position of the frame of the second video data stream in the left channel region and a position of the frame of the second video data stream in the right region.

11. The method of claim 10, wherein generating the video output includes multiplexing the first video data stream with the second video data stream.

12. The method of claim 10, further comprising downsizing frames of the second video data stream such that the sub-video image fits a certain inset window for display.

13. The method of claim 10, wherein the sub-video channel includes an on-screen display (OSD), and wherein adjusting the apparent depth of the sub-video channel comprises modifying a difference between a position of an OSD left region and a position of an OSD right region.

14. The method of claim 10, wherein generating the combined video output includes extracting synchronization signals from the main video channel.

15. A video combiner comprising:
   a multiplexer to multiplex a main video data stream with one or more sub-video data streams to generate combined pixel data, wherein the data streams may be either three-dimensional (3D) or two-dimensional (2D);
   a synchronization extractor to extract synchronization signals from the main video data stream;
   a first coordinate processor to identify pixels to be included in the combined pixel data based on the extracted synchronization signals, the first coordinate processor to operate for 2D and a first region of 3D main video streams; and
   a 3D video module including a second coordinate processor to identify pixels to be included in the combined pixel data based on the extracted synchronization signals, the second coordinate processor to operate for a second region of 3D main video streams;
   wherein a dimensionality of a main video data stream is 3D and a dimensionality of a sub-video data stream is 2D, the 2D dimensionality of the sub-video being converted to 3D to match the 3D dimensionality of the main video image, wherein the video combiner is to copy each frame of data of the sub-video data stream into a left channel region and a right channel region, an apparent depth for a viewer between the video sub-image and a display frame being adjusted by modifying a difference between a position of the frame of the second video data stream in the left channel region and a position of the frame of the second video data stream in the right region.

16. The video combiner of claim 15, wherein the second coordinate processor is shared with the first coordinate processor.

17. The video combiner of claim 15, wherein the 3D video module further includes a vertical synchronization inserter, the vertical synchronization inserter to insert an additional vertical synchronization signal into an active space region in a 3D format of the main video data stream.

18. The video combiner of claim 15, wherein the second coordinate processor operates without knowledge of the 3D format of the main video data stream.

19. The video combiner of claim 15, further comprising a module to receive the combined pixel data and the extracted synchronization signals to generate a combined video output.

20. A non-transitory computer-readable storage medium having stored thereon data representing sequences of instructions that, when executed by a processor, cause the processor to perform operations comprising:
   receiving a plurality of video data streams, a dimensionality of each of the plurality of video data streams being either two-dimensional (2D) or three-dimensional (3D);
   selecting a first video data stream of the plurality of video data streams as a main video channel, a dimensionality of the first video data stream being 3D;
   selecting a second video data stream of the plurality of data streams as a sub-video channel, a dimensionality of the second video data stream being 2D;
   converting the dimensionality of the second video data stream from 3D to 2D to match the dimensionality of the first video data stream; and
   generating a combined video output, the video output including a main video image generated from the main video channel and a video sub-image generated from the sub-video channel;
   wherein conversion of the dimensionality of the second video data stream from 2D to 3D includes copying each frame of data of the second video data stream into a left channel region and a right channel region and adjusting an apparent depth for a viewer between the video sub-image and a display frame by modifying a difference between a position of the frame of the second video data stream in the left channel region and a position of the frame of the second video data stream in the right region.

21. The medium of claim 20, wherein generating the video output includes multiplexing the first video data stream with the second video data stream.

22. The medium of claim 20, further comprising instructions that, when executed by a processor, cause the processor to perform operations comprising:
   downsizing frames of the second video data stream such that the sub-video image fits a certain inset window for display.

23. The medium of claim 20, wherein the sub-video channel includes an on-screen display (OSD), and wherein adjusting the apparent depth of the sub-video channel comprises modifying a difference between a position of an OSD left region and a position of an OSD right region.

24. The medium of claim 20, wherein generating the combined video output includes extracting synchronization signals from the main video channel.

25. The apparatus of claim 1, wherein adjusting the apparent depth between the video sub-image and the display frame includes providing a negative offset between the left image and the right image to make the video sub-image appear to be closer to the viewer than the display frame when the sub-image is a main object for the viewer.

26. The apparatus of claim 1, wherein adjusting the apparent depth between the video sub-image and the display frame for a viewer includes providing a positive offset between the left image and the right image to make the video sub-image appear to be farther from the viewer than the display frame when the main image is a main object for the viewer.

* * * * *